C. R. ELMER.
Singletree for Plows.
No. 78,868.
Patented June 16, 1868.
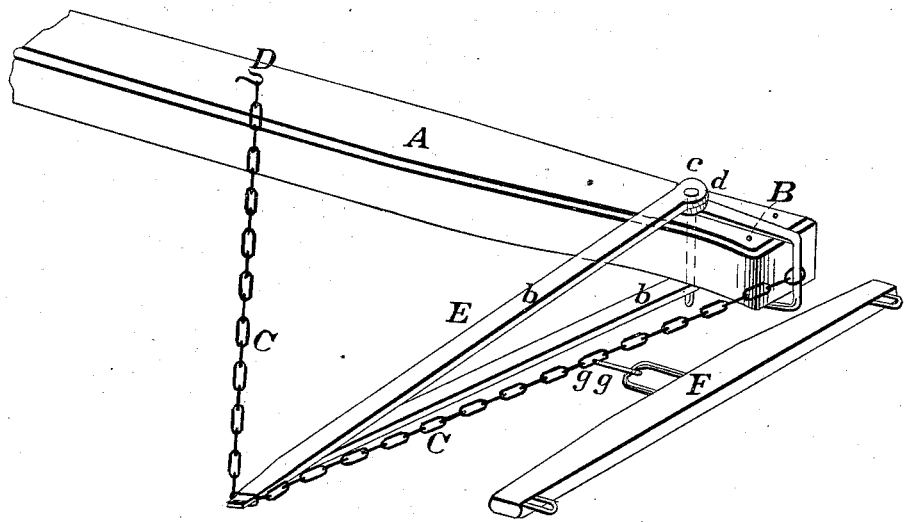
WITNESSES:
J. M. Steelling
Willard Emery
INVENTOR:
Chas. R. Elmer
by his attorney
Stephen Ustick.

United States Patent Office.

CHARLES R. ELMER, OF BRIDGETON, NEW JERSEY.

Letters Patent No. 78,868, dated June 16, 1868.

---

IMPROVEMENT IN SINGLE-TREE BRACE.

---

*The Schedule referred to in these Letters Patent and making part of the same.*

---

TO ALL WHOM IT MAY CONCERN:

Be it known that I, CHARLES R. ELMER, of Bridgeton, in the county of Cumberland, and State of New Jersey, have invented a new and useful Improvement in Single-Tree Braces; and I do hereby declare that the following is a full and exact description thereof, reference being had to the accompanying drawings, and to the letters of reference marked thereon.

The nature of my invention consists in the combination of a chain and brace, for holding it in its proper position, with the beam of a plow, the clevis, and single-tree; the latter being hooked to the chain at a point equal in distance from the clevis to the width of the furrow. This arrangement causes the horse to walk in the furrow instead of on the land-side. I thereby provide for the cultivation of orchards, fruit-trees, small fruits, trucks, and everything which is liable to be injured by being trodden on by the horse, or dragged down by the single-tree, as will be seen by the following description.

The accompanying drawing is an isometrical view of the front end of the beam A, of the plow-clevis B, and single-tree F, with the improvements attached.

A represents the front end of the beam of the plow, and B the clevis. C is a chain, which is linked at one end to the front end of the clevis, and attached at its other end to the beam A, by means of the hook D, or other convenient device. E is a brace, whose jaws *b b* are connected with the clevis-bolt, *c*, which passes through the eyes *d*. The chain C is passed around the outer end *e* of the brace, which fits in one of the links. The single-tree F is connected, by means of its hook *f*, to one of the links *g* of the chain at a point distant from the clevis B equal to the width of the furrow. The left end of the single-tree should not extend beyond the left side of the beam A, so as not to come in contact with anything that might thereby be injured.

It will thus be seen that, by my improvement, by which the horse is caused to walk in the furrow, instead of on the land-side in the usual way, I accomplish the great desideratum of his treading upon or dragging the single-tree against anything which would thereby be injured.

The brace E, instead of being connected with the clevis-pin, may be attached in any convenient manner to the beam A, and other modifications of the device may be made without deviating from its characteristic features. For instance, jointed rods may be used in the place of the chain, there being holes at the front end, near each other, for the reception of the hook *f* of the single-tree, so as to readily adjust it to suit the width of the furrow. Bars or braces, provided with hooks or eyes at each end for fastening the traces, may be attached to the beam A, the centre of the draught being the same as when the single-tree is attached as described.

What I claim as my invention, and desire to secure by Letters Patent, is—

The combination and arrangement of the chain C and brace E with the beam A and single-tree F, substantially upon the principle above described, and for the purpose set forth.

In testimony that the above is my invention, I have hereunto set my hand and affixed my seal, this sixteenth day of April, 1868.

CHAS. R. ELMER. [L. S.]

Witnesses:
D. B. GUIENBACH,
JAS. R. HOAGLAND.